US008464903B2

(12) United States Patent
Baker

(10) Patent No.: US 8,464,903 B2
(45) Date of Patent: Jun. 18, 2013

(54) METHOD FOR DISPENSING ICED BEVERAGES

(75) Inventor: Benjamin Paul Baker, London (GB)

(73) Assignee: Tempak International Pty Ltd, Bowral (AU)

( * ) Notice: Subject to any disclaimer, the term of this patent is extended or adjusted under 35 U.S.C. 154(b) by 489 days.

(21) Appl. No.: 12/668,138

(22) PCT Filed: Jul. 9, 2008

(86) PCT No.: PCT/AU2008/001008
§ 371 (c)(1), (2), (4) Date: Jul. 19, 2010

(87) PCT Pub. No.: WO2009/006691
PCT Pub. Date: Jan. 15, 2009

(65) Prior Publication Data

US 2010/0276443 A1 Nov. 4, 2010

(30) Foreign Application Priority Data

Jul. 9, 2007 (AU) ................................ 2007903705
Nov. 2, 2007 (AU) ................................ 2007906039

(51) Int. Cl.
*B67B 7/00* (2006.01)
*G01F 11/00* (2006.01)
*B67D 7/80* (2010.01)
*F25C 1/00* (2006.01)

(52) U.S. Cl.
USPC ............................... 222/1; 222/146.6; 62/137

(58) Field of Classification Search
USPC .............................. 222/1, 146.6; 62/135, 137
See application file for complete search history.

(56) References Cited

U.S. PATENT DOCUMENTS 2,734,347 A * 2/1956 Fischer et al. .................. 62/136
4,270,673 A 6/1981 Rodth
4,979,647 A 12/1990 Hassell
5,079,927 A * 1/1992 Rodino et al. .................... 62/99
5,086,818 A 2/1992 Bendt (Continued)

FOREIGN PATENT DOCUMENTS

EP 1 602 622 12/2005
FR 2 590 184 5/1987

(Continued)

*Primary Examiner* — Paul R Durand
*Assistant Examiner* — Matthew Lembo
(74) *Attorney, Agent, or Firm* — Michael J. Striker

(57) ABSTRACT

A system for providing an iced alcoholic beverage such as iced beer or carbonated soft drink includes a source of chilled coolant (16), and a beverage line (10) for supplying the beverage. A heat exchanger (20) is disposed in the beverage line (10) for cooling the beverage by heat transfer to the chilled coolant. A restriction (22) or orifice forming a venturi is provided in the beverage line (10) downstream from the heat exchanger. A chilled font (18) for further cooling the beverage is provided downstream from the orifice. The font (18) includes a dispenser tap (30) capable of dispensing the beverage at a relatively low dispense rate and at a relatively higher dispense rate. In use the beverage is first dispensed at a relatively low dispense rate through a smaller orifice of a narrow diameter at a preset low flow rate of beverage, and becomes ice or slush (40). After a period of time the liquid beverage, which may contain ice in the form of flakes, slush, crystals or the like is dispensed at a faster rate, typically through a larger diameter orifice.

14 Claims, 3 Drawing Sheets

U.S. PATENT DOCUMENTS

| | | | | | |
|---|---|---|---|---|---|
| 5,573,145 | A * | 11/1996 | Groh | 222/189.11 |
| 6,105,825 | A * | 8/2000 | Gomi et al. | 222/146.6 |
| 6,345,735 | B1 * | 2/2002 | Harvey et al. | 222/190 |
| 6,928,824 | B2 * | 8/2005 | Hess et al. | 62/66 |
| 7,191,614 | B2 * | 3/2007 | Hess et al. | 62/393 |
| 7,210,601 | B2 * | 5/2007 | Hortin et al. | 222/144.5 |
| 7,628,023 | B2 * | 12/2009 | Lucas | 62/98 |
| 7,743,624 | B2 * | 6/2010 | Schneller et al. | 62/389 |
| 7,785,641 | B2 * | 8/2010 | Scullion et al. | 426/66 |
| 2006/0045942 | A1 | 3/2006 | Sher et al. | |
| 2007/0000941 | A1 * | 1/2007 | Hadden et al. | 222/52 |
| 2010/0276443 | A1 | 11/2010 | Baker | |
| 2011/0011569 | A1 | 1/2011 | Baker | |

FOREIGN PATENT DOCUMENTS

| | | |
|---|---|---|
| GB | 691 569 | 5/1953 |
| WO | 94/20784 | 9/1994 |
| WO | 2006/105605 | 10/2006 |

* cited by examiner

METHOD FOR DISPENSING ICED BEVERAGES

CROSS REFERENCE TO RELATED APPLICATIONS

The invention described and claimed hereinbelow is also described in PCT/AU2008/001008, filed on Jul. 9, 2008 and Australian provisional patent applications No. 2007903705, filed Jul. 9, 2008 and No 2007906039 filed Nov. 2, 2007, the entire contents of which are incorporated herein by reference. These applications provides the basis for a claim of priority of invention under 35 U.S.C. 119 (a)-(d).

FIELD OF THE INVENTION

This invention relates to a method of and system for dispensing iced beverages, particularly iced beer and similar alcoholic and/or carbonated ready to drink beverages.

BACKGROUND OF THE INVENTION

For many years, it has been common to chill beers, lagers and similar beverages in clubs, bars, hotels and other venues from room or cellar temperature, typically around 5 to 15° C. to somewhere around 0° C. for sale to patrons. In the following specification, except where otherwise indicated, the term “beer” should be construed as including any, typically carbonated, and/or relatively low strength alcoholic beverage whether brewed or not. “Beverage” is to include carbonated soft drinks also.

Many beverage companies such as brewers, soft and ready to drink manufacturers often require their beverages to be dispensed at a particular temperature or within a particular range of temperatures when sold in bars, hotels or the like. For example, in Australia, beers are typically required to be sold at a temperature of between 2 and 4° C. inside the glass, which means that the beer has to be dispensed from the tap in a hotel or bar at around 1° to 2° C. to allow for the heat capacity of the glass, which will typically be at a temperature greater than 4° C.

The beer, lager, or the like, is typically chilled by a heat exchanger. Such heat exchangers are usually either installed under a traditional bench or bar top or in the keg cellar, so the size of the heat exchanger is a consideration. At the same time, the dispensing apparatus must be sufficiently efficient to be able to dispense beer at the correct temperature, as prescribed by the beverage company, and on demand.

International Patent Application No PCT/AU2006/000459 entitled “Improvements in control of heat exchangers” the entire contents which are incorporated herein by reference, discloses such a heat exchanger suitable for cooling beverages.

The applicant’s co-pending Australian provisional application No 2008900054 entitled “Improvements in Heat Exchangers for Dispensing Sub-Zero Beer” filed 4 Jan. 2008, the entire contents which are incorporated herein by reference, also discloses a heat exchanger suitable for cooling beverages.

However, whereas until a few years ago, patrons of hotels and bars were happy to drink chilled beer at a temperature of around 2 to 4° C., dispensing beer at even cooler temperatures, even subzero temperatures, is now fashionable in bars, restaurants, hotels and other venues. It will be appreciated that since beer contains alcohol, and is carbonated (under pressure) this depresses the freezing point of the beer such that it freezes at temperatures below the freezing point of water. Generally, the stronger the beer in alcohol content, the lower the temperature the beer freezes at. Dispensing beers at such low temperatures is tricky and is not possible without an increase in the performance of older type heat exchangers.

More recently, it has been mooted to produce iced beer, however this has not proved practical with traditional draught beverage dispensing systems.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

In a first broad aspect, the present invention provides a method providing an iced beverage, typically alcoholic beverage such as iced beer, or the like, comprising the steps of:

- dispensing chilled alcoholic beverage from a font or the like, the beverage being at a subzero temperature, typically in the range of minus 2.5 to minus 4.3° C.;
- cooling the font to a temperature which is cooler than the beer but not substantially cooler, typically less than one to two degrees cooler than the beverage;
- wherein the beverage is first dispensed through a smaller orifice of a narrow diameter at a preset low flow rate of beverage, which in turn becomes ice or slush; and
- after a period of time dispensing the liquid beverage, which may contain ice in the form of seeds, flakes, slush, crystals or the like through a larger diameter orifice.

In a preferred embodiment the orifice is partially opened to produce the preset low flow then opened fully substantially immediately after the flow of beverage through the reduced orifice becomes restricted under the low flow rate such that no ice or slush flow is therethrough, which restriction acts as an indicator for the operator to open the tap fully.

The opening of the tap to full flow also clears the ice or slush from the small orifice.

The heat exchanger is preferably, but need not be, a tubular heat exchanger of the type described in PCT/AU2006/000459.

In a related aspect, the present invention provides a method providing an iced alcoholic beverage such as iced beer or the like, comprising the steps of

- supplying the beverage at a pressure of typically about 28 to 36 psi, typically using a mixture of compressed nitrogen and carbon dioxide, and a temperature, typically in the range of 2 to 6° C., to a heat exchanger:
- cooling the beverage in the heat exchanger to a temperature of about −3.6° C. to −4.8° C.;
- passing the cooled beverage through an orifice (venturi tube) and subsequently into a pipe of increased diameter relative to the orifice thereby creating a venturi effect in the beer line, causing the beverage to thereby release a, preferably predetermined, amount of carbon dioxide from the beverage and cause the production of ice seeds in the beverage;
- dispensing the chilled beverage from a font or the like, cooled to a temperature which is cooler than the beer but not substantially cooler, typically less than one to two degrees cooler than the beverage;
- wherein the beverage is first dispensed through a smaller orifice of a narrow diameter at a preset low flow rate of beverage, which in turn becomes ice or slush; and after a period of time dispensing the liquid beverage, which may contain ice in the form of flakes, slush, crystals or the like through a larger diameter orifice.

The desired temperature of the beverage on exit from the heat exchanger is set dependant on the alcohol content of the beverage.

Typically the orifice has a diameter of 2.5 to 4 mm compared with the diameter of the rest of the beverage line of about 8 to 10 mm. The venturi tube may be around 100 to 150 mm long.

In a related aspect the present invention provides a system for providing an iced alcoholic beverage such as iced beer or the like, comprising:

- a source of chilled coolant, such as a glycol set, or direct refrigeration Freon system;
- a beverage line for supplying the alcoholic beverage;
- a heat exchanger disposed in the beverage line for cooling the alcoholic beverage by heat transfer to the chilled coolant;
- a restriction or orifice forming a venturi in the beer line downstream from the heat exchanger;
- a chilled or chillable font for further cooling the beverage downstream from the orifice; and
- a dispenser tap typically adjacent or part of the font, capable of dispensing the beverage at a relatively low dispense rate and at a relatively higher dispense rate.

The dispenser tap may have two valves one defining a relatively smaller dispense opening and one a relatively larger dispense opening or it may have a single dispense opening which includes a partly closed dispense position and a more fully open dispense setting.

Throughout this specification the word “comprise”, or variations such as “comprises” or “comprising”, will be understood to imply the inclusion of a stated element, integer or step, or group of elements, integers or steps, but not the exclusion of any other element, integer or step, or group of elements, integers or steps.

BRIEF DESCRIPTION OF THE DRAWINGS

A specific embodiment of the present invention will now be described by way of example only, and with reference to the accompanying drawings in which.

DETAILED DESCRIPTION OF PREFERRED EMBODIMENTS

Figure 1:
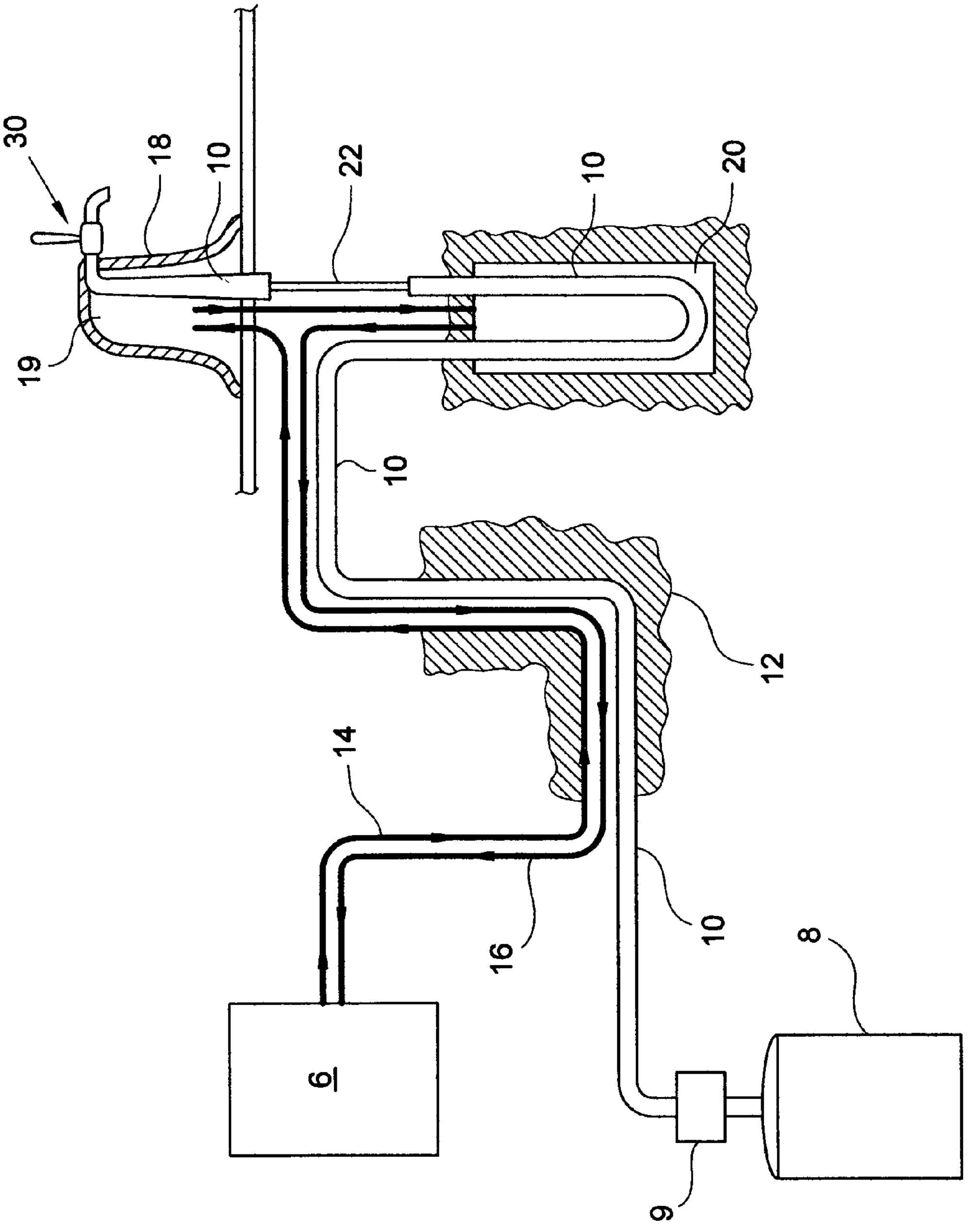
FIG. 1 is a schematic view of system for dispensing iced beer.

Referring to the drawings, FIG. 1 shows schematically a view of the major components of a system for dispensing iced beer embodying the present invention. Beer flows from a keg 8 or the like in a cellar at a temperature of from 2-6° C. along a beverage line or pipe 10, typically having a diameter or 8 to 10 mm. A $CO_2$ driven beverage pump, schematically shown at 9, is provided for maintaining a positive back pressure on the beverage line 10. The beverage is typically compressed using both compressed nitrogen and carbon dioxide gases. A typical tap pressure is 5 psi and the pressure range at the cellar may be from 25 to 40 psi, depending on the beverage style. Typically, the beer is supplied from the cellar at a pressure of between 28 and 36 psi using the mixture of nitrogen and carbon dioxide gases.

The pipe is located in an insulated casing 12, only part of which is shown. It is to be noted that typically all cold or cool pipes or components of the system will be insulated, the insulation being omitted from the Figure for reasons of clarity. Also located in the casing are delivery 14 and return 16 pipes carrying chilled coolant (such as glycol) at a temperature of about −5.degree. C. from a cooler/heat exchanger (known as a “refrigeration set”, shown schematically at 6 to a flooded font 18 and back to the refrigeration set for re-cooling the coolant.

The beer line 10 passes from the casing 12 to a heat exchanger 20 which may be of the type described in PCT/AU2006/000459, but which could be any other suitable high efficiency compact heat exchanger. The beer exits the heat exchanger at a temperature of −2° C. to −3° C. and immediately passes through a narrower orifice section 22 having a diameter of from 2.5 to 4 mm and a length of 100 to 150 mm. At the end of the reduced diameter section 22 the beer line 10 increases in diameter to 8 to 10 mm. This creates a pressure drop at the end of the orifice 22. The pressure drop acts as a controlled method of stimulating production of ice seeds in the beer.

The sudden release of carbon dioxide at low beverage dispense rates results in ice seeds being formed in the beer outlet line 10 and supports the production of ice crystals. The beer then passes into the flooded font 18 which defines a volume 19 filled with glycol through which the beer line 10 passes. The beer is dispensed through a two stage beer tap 30 of the type described in Australian provisional application No 2007903705.

Figure 2:
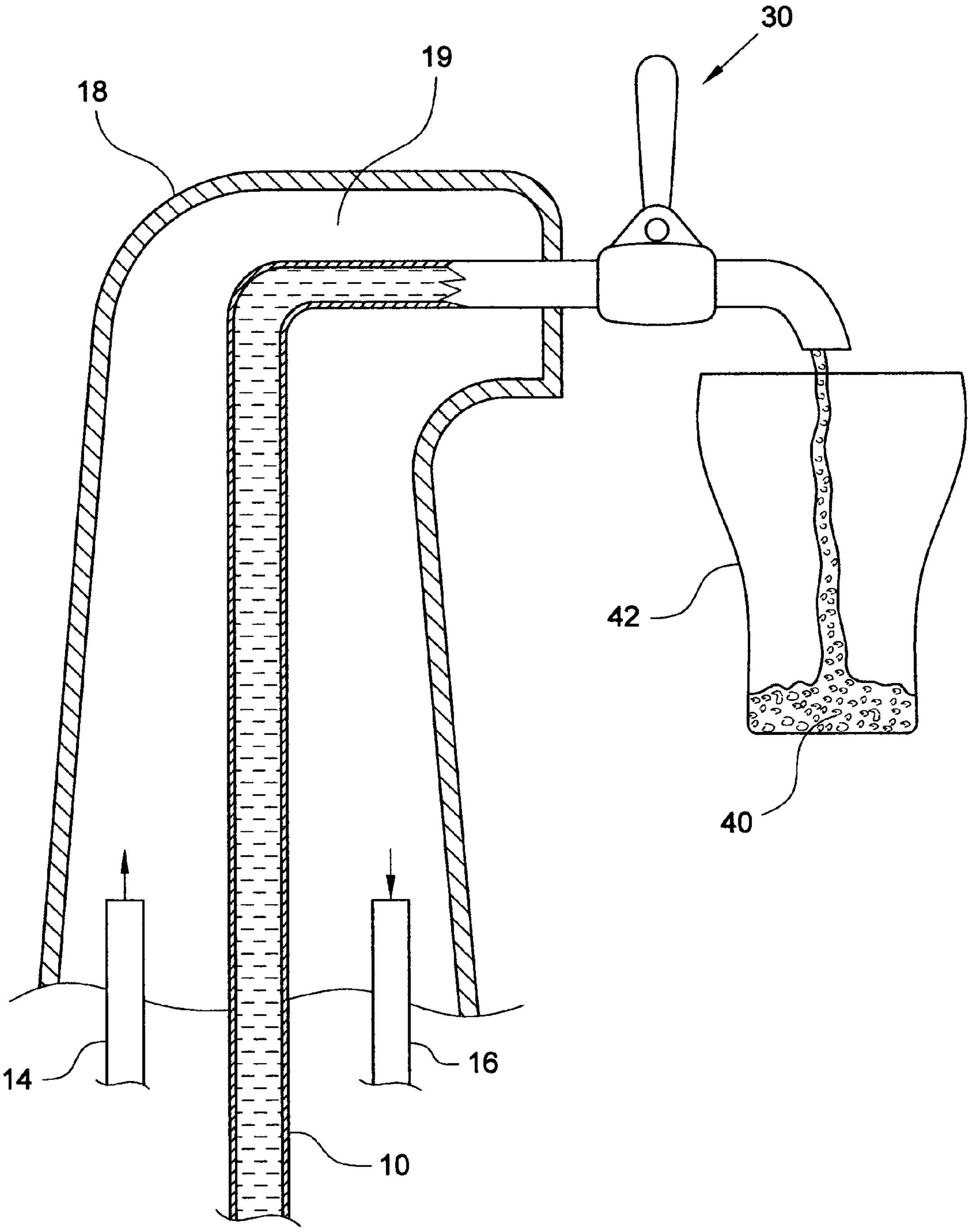
FIG. 2 is a schematic sketch of a beer tap in a partly open position.
Figure 3:
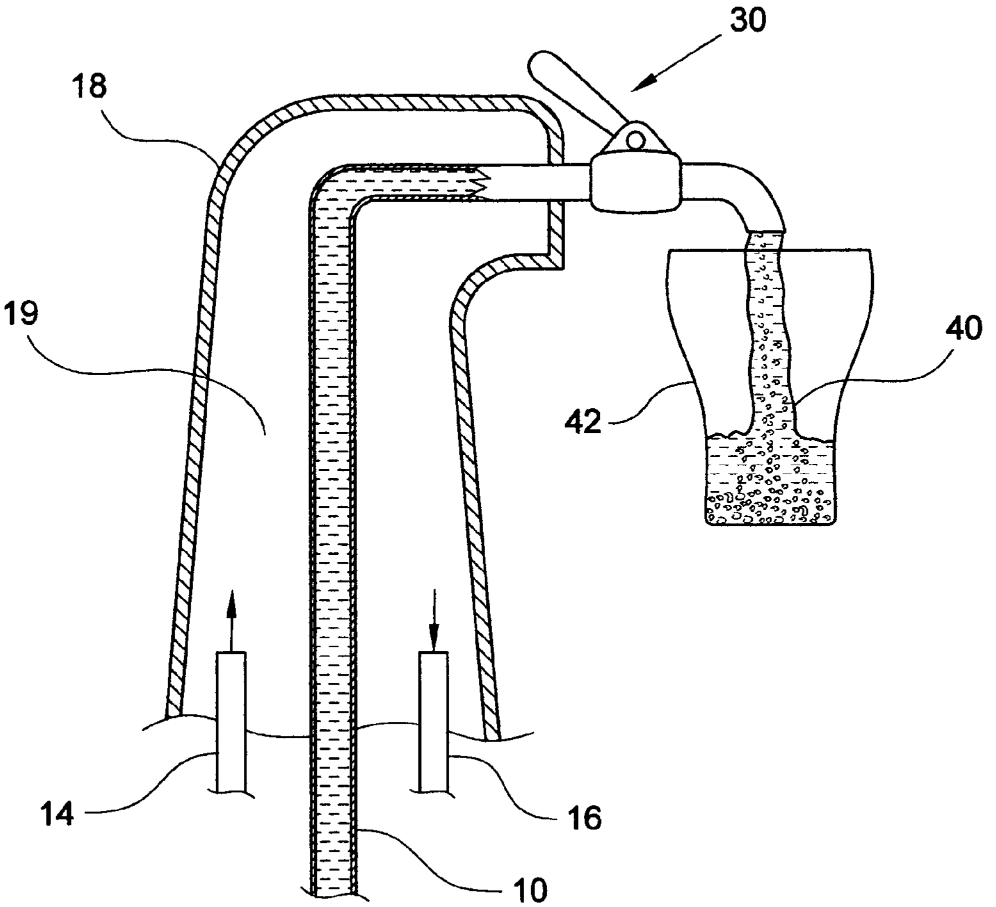
FIG. 3 is a schematic sketch of a beer tap in a fully open position.

FIGS. 2 and 3 show a schematic drawing of the two stage beer tap 30 of a beer font 18. The drawings are conceptual and illustrate the principals of operation only which can be implemented using other designs of tap.

The beer tap 30 is first only partially opened. How this is achieved is not critical, and the type of valve closing the tap is also not critical. It is also possible to effect the method using an arrangement in which there are two valves, a main pipe and a bypass valve.

The diameter of the tap when the valve is fully open is about 6 mm, giving an area of about 30 $mm^2$. The tap may also be partially opened to produce a much reduced low flow rate through an aperture having an effective diameter of about 1.5 mm (but which may be in the range of 1-2 mm), or an area of 1.75 $mm^2$.

In use, the tap is first only partially opened as shown in FIG. 2 to produce a preset small flow through the reduced size aperture. This results in the formation of ice seeds in the pipe 10 within the heat exchanger, as described above due to the pressure drop as the beer exits the orifice 22. Ice slurry or frozen beer 40 is discharged from the tap 30 into a glass 42 or other receptacle under the tap, which continues to flow for a few seconds until the reduced diameter tap orifice becomes restricted with ice. Behind the restriction the beer itself does not freeze as the percentage alcohol content in the liquid phase goes up due to water in the form of ice precipitating out, both as the discharged slush and in the pipe downstream from the tap 10. The reduction of the flow acts as a trigger for the operator to open the tap fully, as shown in FIG. 2. At this time the opening of the tap fully triggers the flow of sub zero beer which may contain ice crystals into the glass 40 to produce a semi-frozen beer drink.

Clearly this can be performed with other relatively weak alcoholic and/or carbonated beverages such as lagers, ciders RTDs (mixtures of spirits and soft drinks) having a strength of a few % alcohol, say 2% to about 10%, however, the temperature of the iced drink will vary depending on the strength of the beverage. The method may also be used with non-alcoholic carbonated soft drinks having a high sugar or dissolved salts content, the dissolved sugar/salts depressing the freezing point of the drink.

Figure 4:
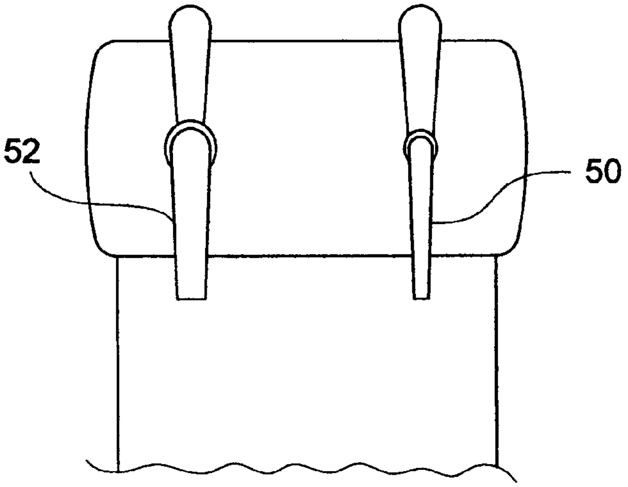
FIG. 4 is a schematic front view of an alternative beer tap for use in the system and method of the present invention.

The dispensing of the iced beverage can be achieved by having set positions using a single valve or by having a bypass valve and two flow paths one narrow and one much wider. A dispensing tap having narrow 50 and wider 52 flow paths is shown schematically in FIG. 4.

Where reference is made herein to the diameter of a tube or orifice or the like it will be appreciated that the reference is to the effective diameter of the tube or pipe and that the orifice pipe or the like need not be circular in cross-section, but may be any suitable cross-section.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method for providing an iced beverage, comprising the steps in the order of:

supplying the beverage to a heat exchanger;

cooling the beverage in the heat exchanger;

passing the beverage through a beverage line containing a Venturi tube or constriction comprising an orifice of reduced diameter subsequently followed by a pipe of increased diameter relative to the orifice, thereby producing ice seeds in the beverage;

supplying the beverage and ice seeds to a font cooled to a temperature that is cooler than the beverage, dispensing the beverage and ice seeds through a dispensing tap at a preset low flow rate, the dispensing tap comprising an aperture, wherein ice particles build up at the aperture, restricting the flow of the beverage;

dispensing the beverage and ice particles through an aperture of greater diameter.

2. The method as claimed in claim 1 wherein the beverage is an alcoholic beverage having an alcohol content by volume of from 2 to 10%.

3. The method as claimed in claim 1, wherein the dispensing tap has a single dispensing aperture which includes a partly closed dispensing position and a substantially fully open dispensing position, wherein restricted flow of beverage through the partly closed aperture due to ice acts as an indicator for an operator to open the tap to the substantially fully open dispensing position.

4. The method as claimed in claim 1, wherein the beverage is supplied along the beverage line under pressure using compressed gas, and at a temperature in the range of 2 to 6° C., to the heat exchanger, and the beverage is cooled in the heat exchanger to a sub-zero temperature of −2.5 to −4.8° C.

5. The method as claimed in claim 4, wherein the sub-zero temperature is from −2.5° C. to −4.3° C.

6. The method as claimed in claim 1 wherein the temperature of the font, which is cooler than the beverage, is less than one to two degrees cooler than the beverage exiting the heat exchanger.

7. The method as claimed in claim 1 wherein the ice is in the form of flakes, slush or crystals.

8. The method as claimed in claim 1, wherein the beverage is an alcoholic beverage or a carbonated soft drink.

9. A method for providing an iced beverage, comprising the steps in the order of:

supplying the beverage along a beverage line under pressure using compressed gas and at a first temperature range to a heat exchanger;

cooling the beverage in the heat exchanger to a second temperature range;

passing the beverage through a Venturi tube or constriction comprising an orifice of reduced diameter and subsequently followed by a pipe of increased diameter relative to the orifice, thereby producing ice seeds in the beverage;

supplying the beverage and ice seeds to a font, wherein the font is cooled to a temperature which is cooler than the beverage exiting the heat exchanger;

dispensing the beverage and ice seeds through a dispensing tap at a preset low flow rate, the dispensing tap comprising an aperture, wherein ice particles build up at the aperture, restricting the flow of the beverage;

dispensing the beverage and ice particles through an aperture of greater diameter.

10. The method as claimed in claim 9 wherein the orifice has a diameter of 2.5 to 4 mm and wherein the diameter of the beverage line is about 8 to 10 mm.

11. The method as claimed in claim 9 wherein the venturi tube is from 100 to 150 mm long.

12. The method as claimed in claim 9 wherein the beverage is supplied under pressure of 28 to 36 psi using a mixture of compressed nitrogen and carbon dioxide.

13. The method as claimed in claim 9 wherein the first temperature range is from 2 to 6° C.

14. The method as claimed in claim 9 wherein the second temperature range is from about −3.6° C. to −4.8° C.

* * * * *